May 23, 1950 G. F. SCHLOTE 2,508,971
POWER TRANSMISSION OR TORQUE CONVERTER
Filed Dec. 17, 1945 10 Sheets-Sheet 4

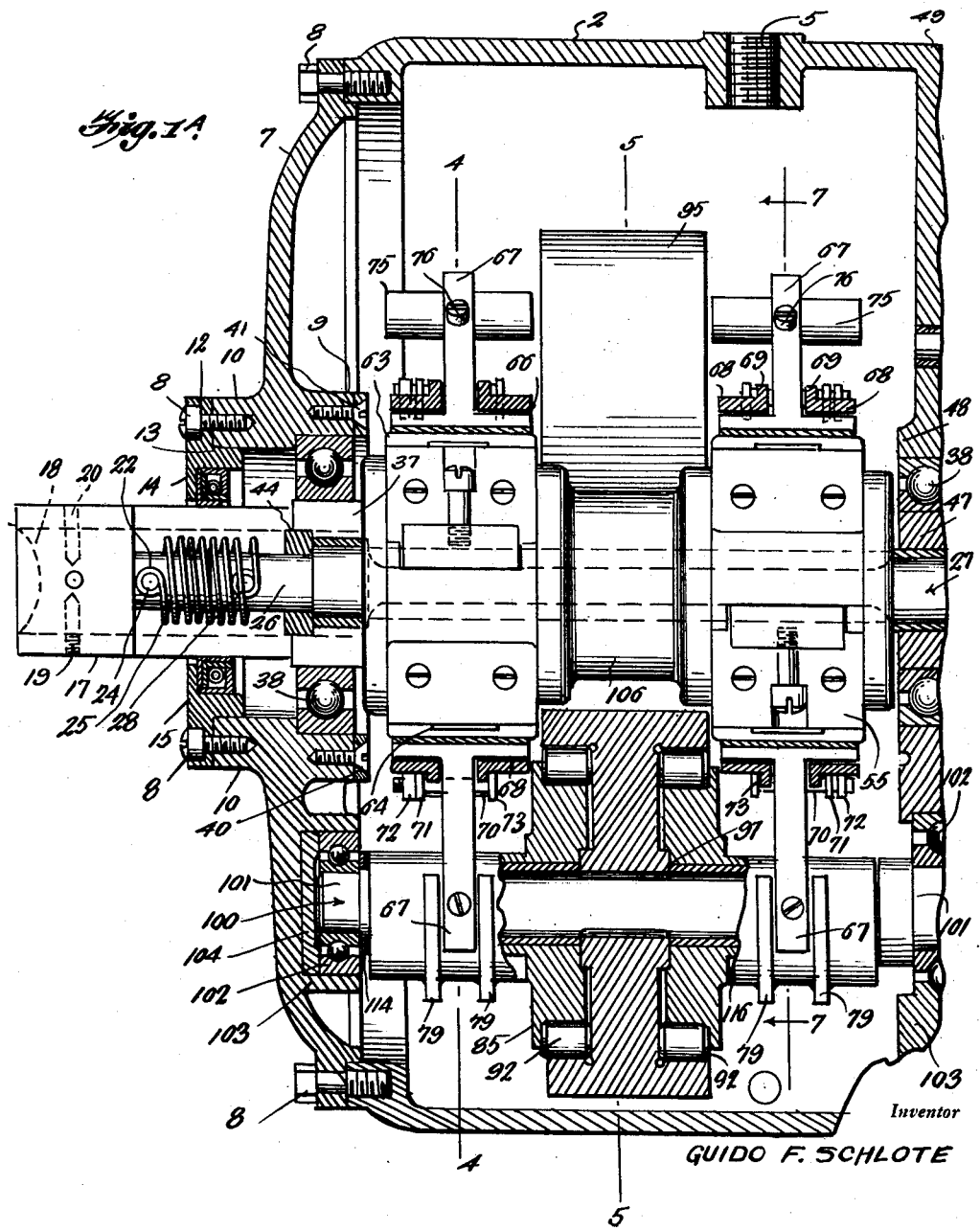

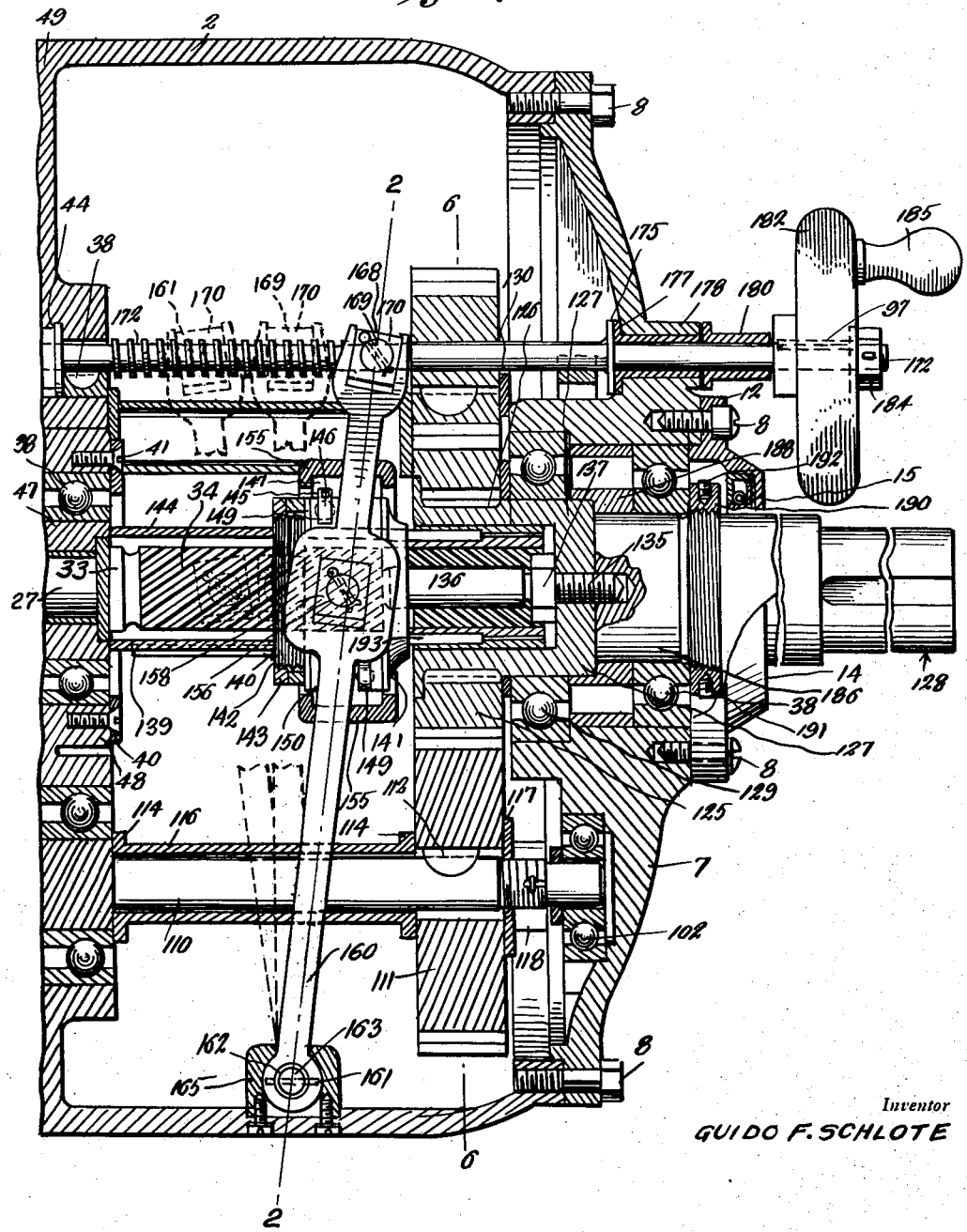

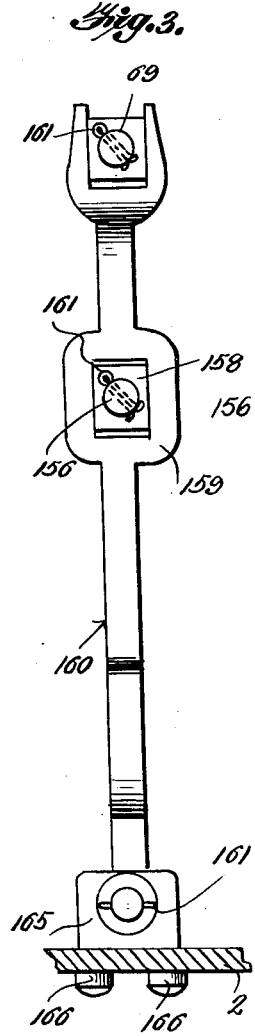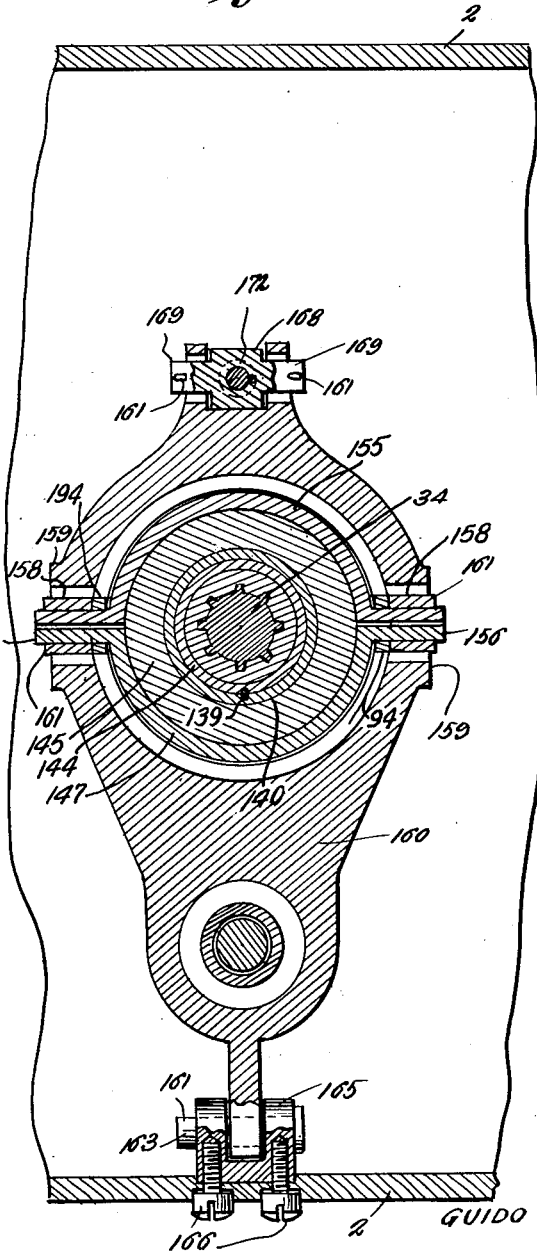

Inventor
GUIDO F. SCHLOTE

By Randolph & Beavers
Attorneys

May 23, 1950     G. F. SCHLOTE     2,508,971
POWER TRANSMISSION OR TORQUE CONVERTER
Filed Dec. 17, 1945     10 Sheets-Sheet 5

Inventor
GUIDO F. SCHLOTE

By Randolph & Beavers
Attorneys

May 23, 1950     G. F. SCHLOTE     2,508,971
POWER TRANSMISSION OR TORQUE CONVERTER
Filed Dec. 17, 1945     10 Sheets-Sheet 6

Inventor
GUIDO F. SCHLOTE

By Randolph & Beavers
Attorneys

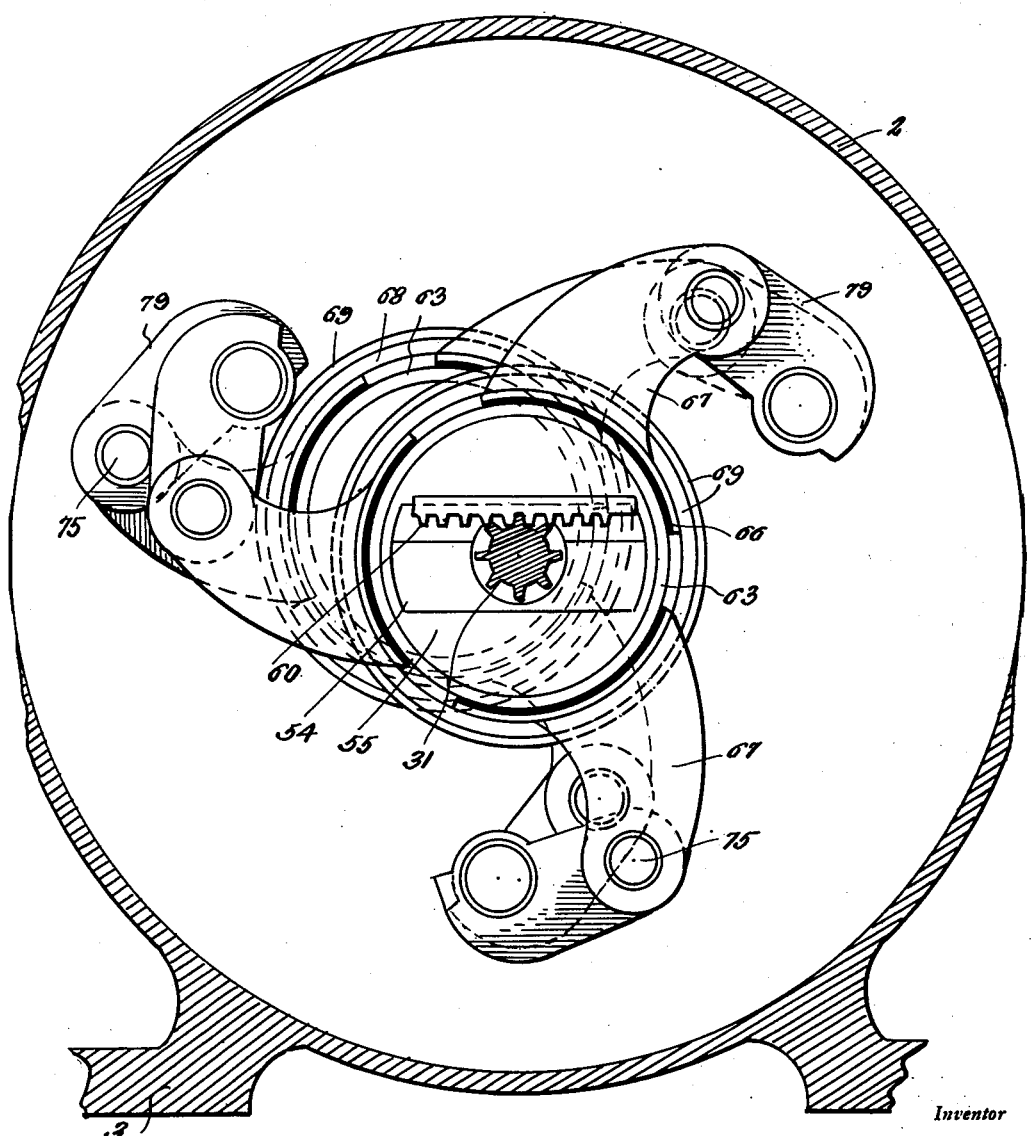

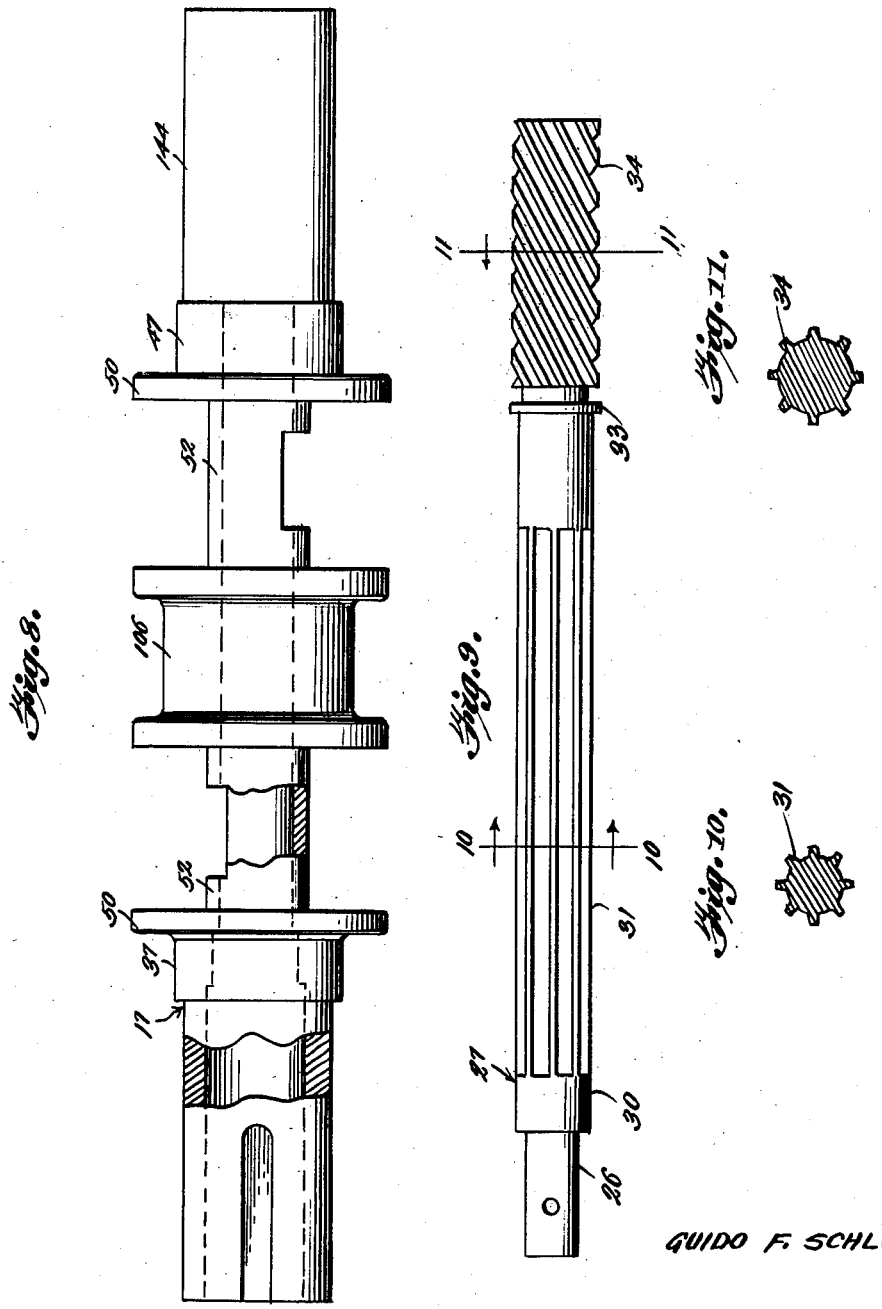

May 23, 1950            G. F. SCHLOTE            2,508,971
POWER TRANSMISSION OR TORQUE CONVERTER
Filed Dec. 17, 1945                          10 Sheets-Sheet 10
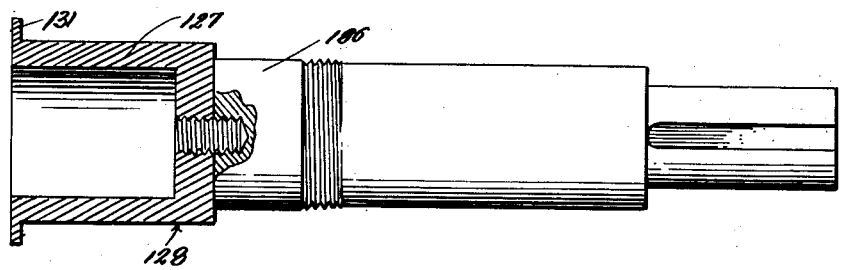
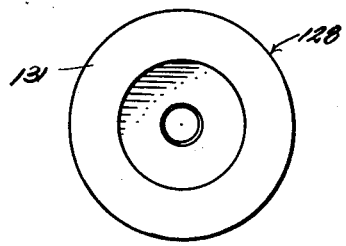 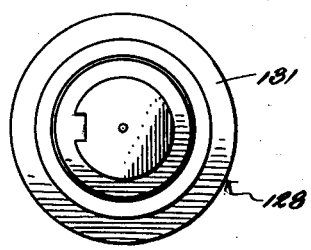
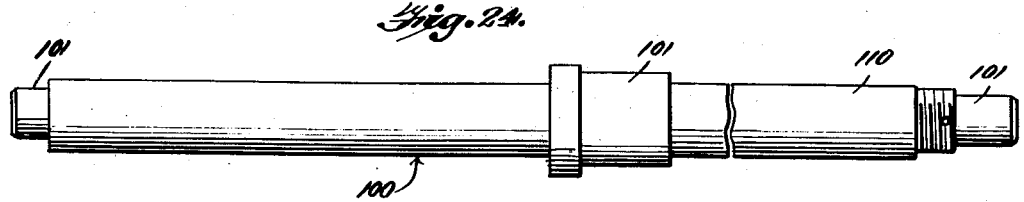
Inventor
GUIDO F. SCHLOTE
By Randolph & Beavers
Attorneys Patented May 23, 1950

2,508,971

UNITED STATES PATENT OFFICE 2,508,971

POWER TRANSMISSION OR TORQUE CONVERTER

Guido F. Schlote, Milwaukee, Wis.

Application December 17, 1945, Serial No. 635,502

4 Claims. (Cl. 74—117)

This instant invention relates to power transmission primarily but not necessarily for self-propelled vehicles. In part, the instant invention constitutes improvements over the structures disclosed and claimed in Letters Patent 2,026,142 and 2,204,514 issued to me Dec. 31, 1935, and June 11, 1940, respectively, for transmission mechanism.

The invention aims to provide a novel combination clutch and transmission mechanism adapted to replace the present transmission and clutch, being connected to the crankshaft of the engine and the differential or rear wheel drive.

An object of the invention is to improve the construction of U. S. Pat. 2,204,514 by changing the adjusting mechanism and locating the same in the rear compartment of the transmission.

Another object of the invention is to improve the construction referred to in the preceding paragraph by standardizing the rockers, the clutch parts connected thereto and the wristpins connecting both.

The construction hereinafter set forth considerably reduces the amount of heat generated in the patented structure.

The vibrations of the rockers are lessened.

The adjusting mechanism is more efficient and practical.

The cost of production is also reduced. The same applies to the cost of assembling and taking the device apart.

This new construction also permits a better, simpler and more practical way of coupling the input shaft to a power plant.

Further more this new construction makes a considerable simplification of the lubricating system possible.

Various additional objects and advantages will become apparent from a consideration of the description following taken in connection with the accompanying drawings illustrating a preferred and operative embodiment.

In said drawings—

Figure 1A is a view substantially in diametral longitudinal section through the front end part of a transmission mechanism constructed according to the invention;

Figure 1B is similar view through the other remaining or rear end part of such mechanism;

Figure 2 is a section through the casing and the adjusting fork;

Figure 3 is a section at right angles to the section of Figure 2 and side view of the fork;

Figure 7 is a transverse vertical section on line 7—7 of Fig. 1A;

Figure 8 is a side view, partly broken away and partly in section, of the main input shaft;

Figure 9 is a side view of the adjusting or Bendix shaft;

Figure 25:
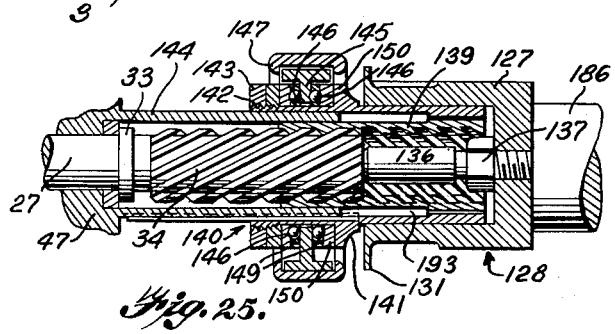
Figure 72:
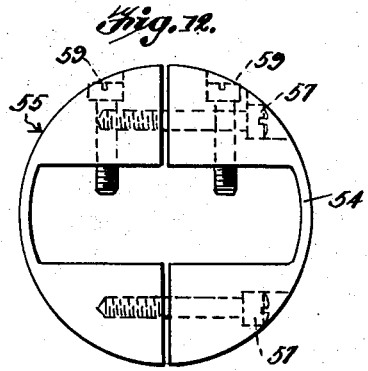
Figure 73:
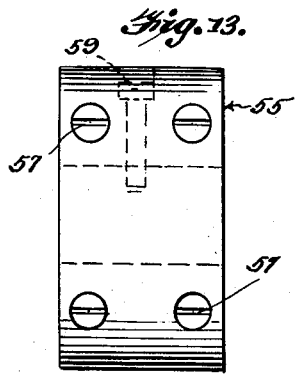
Figure 74:
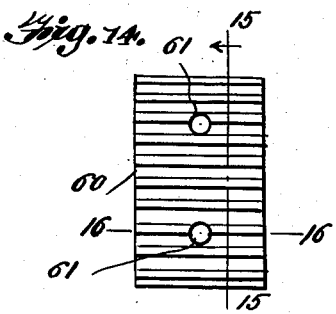
Figure 75:
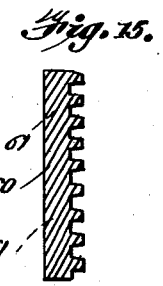
Figure 76:
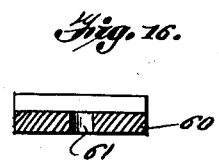
Figure 77:
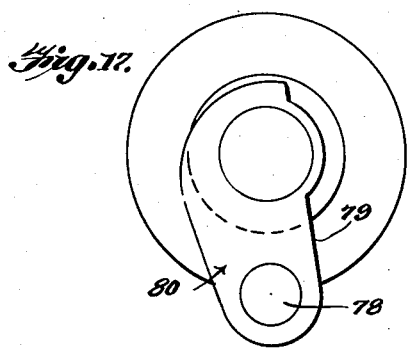
Figure 78:
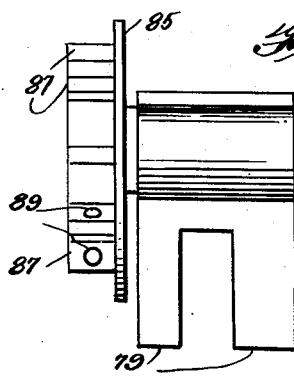
Figure 79:
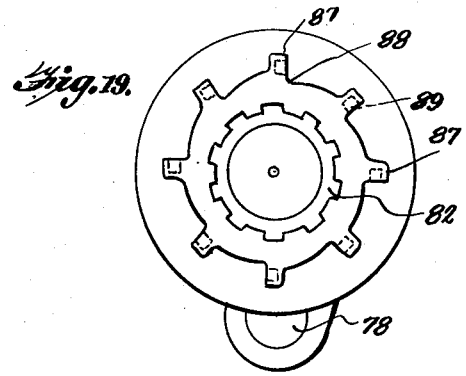

Figures 10 and 11 and cross sectional views of the Bendix shaft on lines 10—10 and 11—11, respectively of Figure 9;

Figure 12 is a detail end view of the eccentric assembly;

Figure 13 is a side view of the assembly;

Figure 14 is a detail front view of the rack;

Figure 15 is a detail longitudinal section on line 15—15 of Fig. 14;

Figure 16 is a detail transverse section of the rack on line 16—16 of Fig. 14;

Figure 17 is a detail front view of one of the alternators;

Figure 18 is a side view of an alternator;

Figure 19 is a rear view of an alternator;

Figure 20 is a detail side view of the main output shaft, the left-hand portion being shown in diametral section;

Figure 21 is a view of the left-hand end of the main output shaft;

Figure 22 is a view of the right-hand end of the main output shaft;

Figure 23 is a detail side view of the adjusting screw shaft;

Figure 24 is a detail side view of one of the auxiliary shafts;

Figure 25 is a fragmentary sectional view illustrating the relationship between the right end of the main input shaft and the high pitch nut, the right end of the Bendix shaft being illustrated in elevation.

Referring specifically to the drawings wherein like characters of reference designate like or similar parts, 2 denotes the cylindrical wall of a casing the axis of which is horizontally disposed and which is supported by feet 3 with bolt holes 4 (Figs. 4–7) and provided at the top with an eye bolt 5. The left-hand or front or input end of the casing is closed by a front end plate 7 which is secured to the front end of the cylindrical wall by bolts 8 and bulges outwardly and has a central opening surrounding the axis of the cylinder and within a pair of annular flanges 9 and 10, the former of which extends inwardly while the latter extends outwardly and is provided with tapped holes for the securing bolts 8 of a small front end ring plate 12 which carries on its inner side an annular flange 13 disposed within the outwardly extending flange 10. Within the flange 13 and on the inner side of a flat flange 14, being part of the plate 12, is an annular oil retainer 15 which surrounds the left-hand end portion of the main hollow input shaft 17, shown in detail in Fig. 8.

The outer end of shaft 17 is closed by a plug 18 held against turning relatively to the shaft in adjusted position by a screw 19 which may be threaded into one of a plurality of radial holes 20 formed in the plug. The inner end of the same carries a reduced extension 22 provided with a radially disposed taper pin 24 to which one end of a coil spring 25 is fastened. This spring surrounds the extension described and an extension 26 of an adjusting or Bendix shaft 27 and is fastened to a taper pin 28 extending from such extension 26.

The shaft 27 is shown in detail in Figs. 9–11 and includes an intermediate section 30 the major part of which is provided with gear teeth 31. The section 30 terminates in a radial flange 33 whereby the former is joined to a threaded section 34 of high pitch and larger cross section than the gear section.

The left-hand end portion of shaft 17 enclosing the plug 18, spring 25 and a portion of the extension 26 of adjusting shaft 27 is integral with a relatively short journal portion 37 which is journaled in a ball bearing 38 seated in an annular and angular recess formed in the inner side of the inwardly extending flange 9 of the front end plate 7. This bearing is held at its inner end by a ringshaped retaining plate 40 secured by screws 41 to the inner end of the flange seating the ball bearing.

The journal portion of shaft 17 surrounds the thinner reduced part of a bushing 44 which surrounds the smooth or untoothed left-hand part of the intermediate section 30 of the adjusting shaft 27. A larger and thicker part of the bushing 44 occupies the space between the interior of shaft 17 and a portion of the extension 26 of the shaft 27.

Near the right-hand or inner end of shaft 17 is formed a bearing portion 47 concentric with part 37, and which is journaled in a pair of spaced bearing devices 38 mounted in a central opening in the thickened central part 48 of a partition 49 of the casing. The bearing device 38 to the right is held against axial motion by a retaining ring 40 secured by screws 41 to the right-hand side of the central enlargement of the partition. The two bearing devices in which the shaft portion 47 is journaled, are spaced from one another by a pair of spaced concentric spacing rings (not shown).

Figure 4:
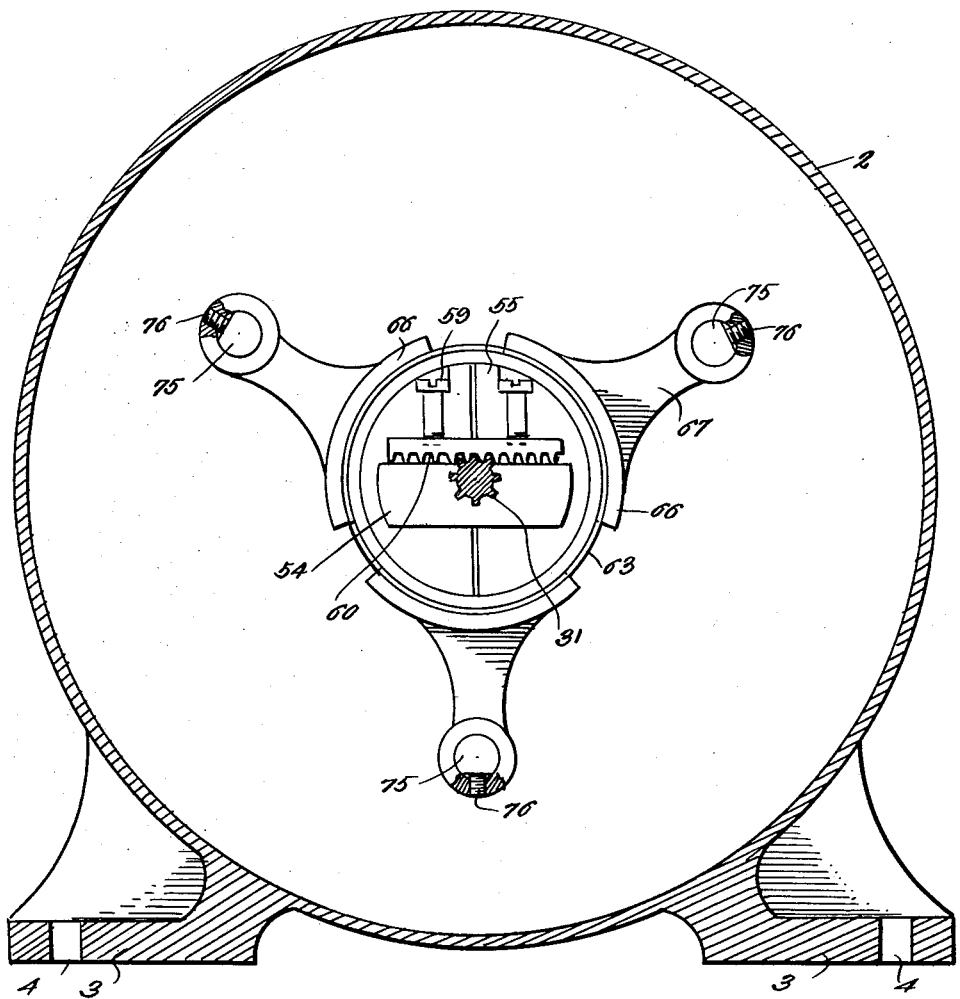
Figure 4 is a transverse section on line 4—4 of Fig. 1A.
Figure 5:
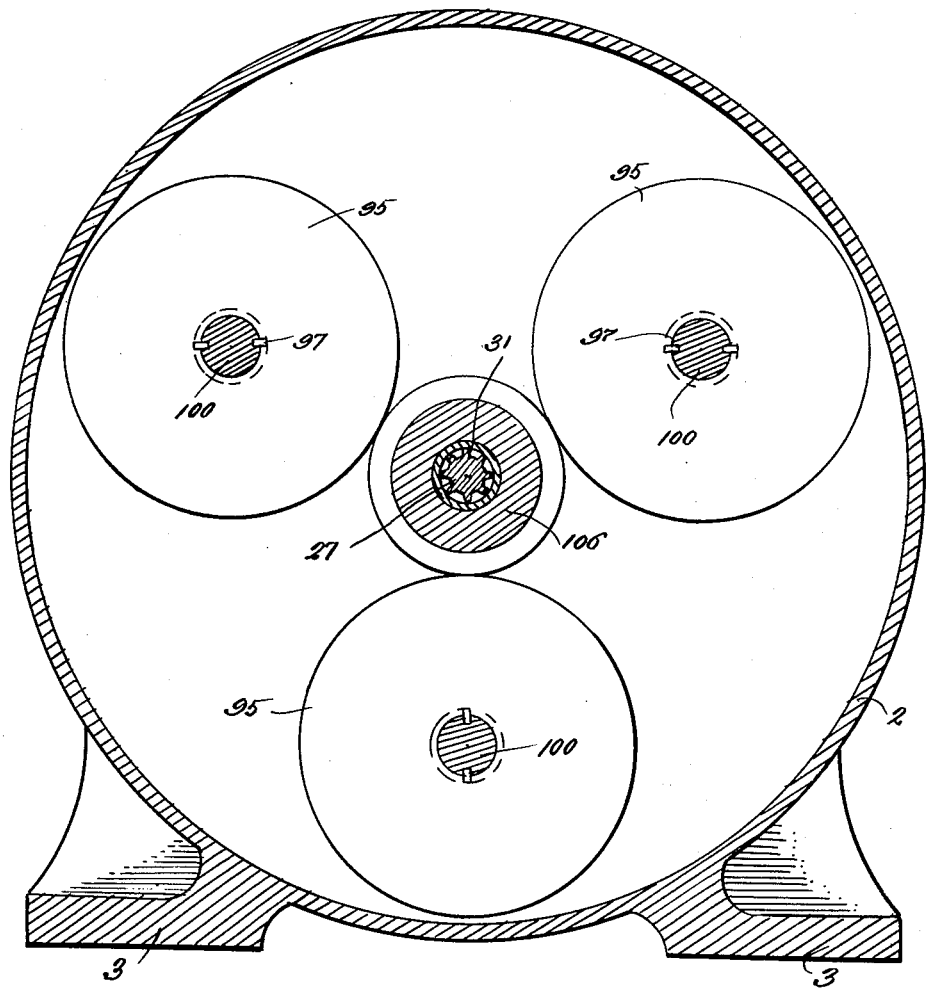
Figure 5 is a transverse section on line 5—5 of Fig. 1A.
Figure 6:
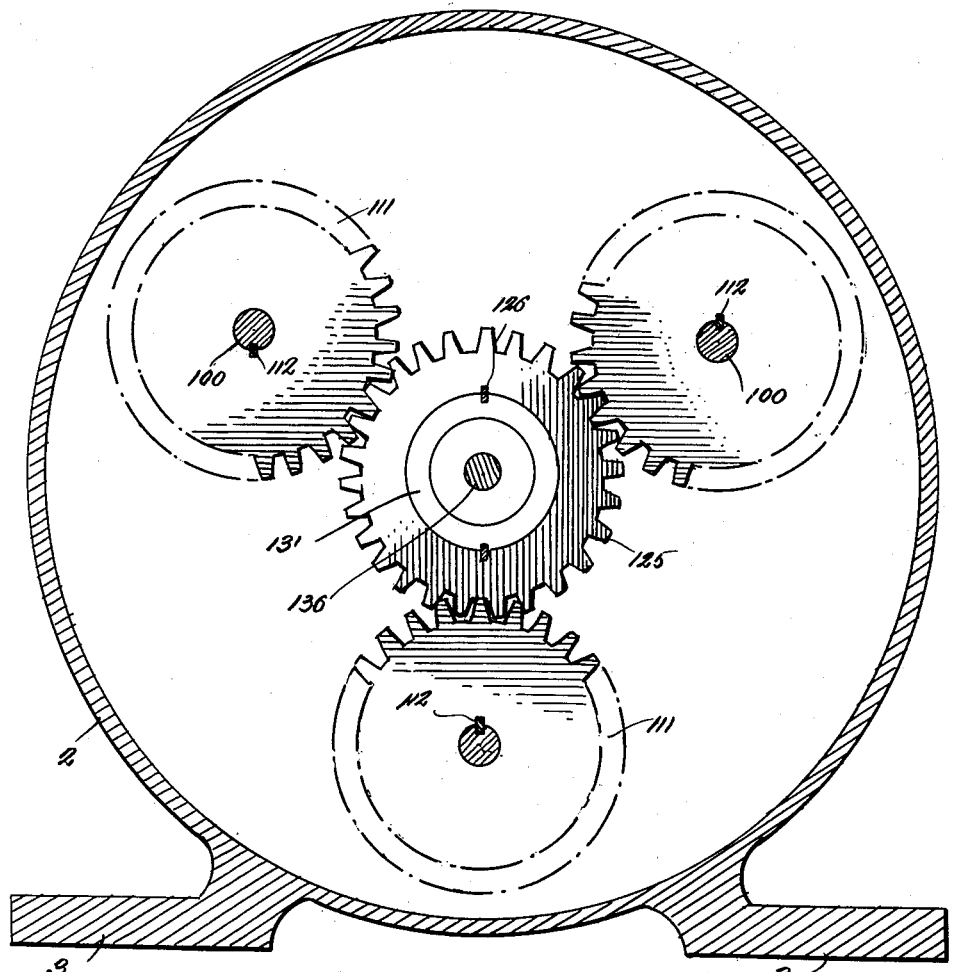
Figure 6 is a transverse section on line 6—6 of Fig. 1B.

Between the bearing portions 37, 47 of shaft 17 are a pair of spaced flanges 50 on the inner side of each of which is an eccentric shaft part 52 which parts 52 are circumferentially spaced from one another 180°. The transverse cross section of either part 52 is generally trapezoidal and is broadly the remainder of a circle from which unequal segments have been cut off by parallel chords. The cross section differs further from a trapezoid by the formation of a fragmentary cylindrical hollow in each eccentric part 52 (Figs. 4, 7). This hollow opens through the longer chord referred to and is a part of the hollow extending throughout the shaft 17. In assembled condition the toothed section 30 of the adjusting shaft 27 is housed in the portion of shaft 17 between the flanges 50 so that the gear teeth of the shaft 27 project through the openings in the wider chordal surfaces of the eccentric parts 52.

Either of the eccentric parts is mounted for sliding movement within an opening 54 formed in an eccentric assembly or control or governor device, generally denoted by 55 and illustrated in detail in Figs. 12 and 13. Either assembly 55 comprises a pair of substantially semi-cylindrical parts each having an axial length equal to that of one of the eccentric shaft parts 52. The two halves of either assembly are connected by four bolts 57 the heads of which are seated in sockets deep enough so that the heads do not project beyond the cylindrical surface of the assembly. Another pair of bolts 59 extend each through one half of an assembly, parallel to one another and to the diametral surface of either half into the opening 54 for threaded engagement with a rack 60 (Figs. 14–16) which meshes with the gear teeth 31 of the adjusting shaft and has holes 61 for the bolts 59. Since the hollow in one of the eccentric input shaft sections 52 opens in a direction opposite to that of the other, the teeth of the two racks extend in opposite direcions.

Either eccentric assembly or governor device 55 is journaled in a steel ring 63 of equal axial length which is provided on its inner surface with an intermediate oil groove 64. The outer surfaces of the steel rings 63 contact the inner concave surfaces of fragmentary cylindrical portions 66 of three rocker arms 67. The axial length of the cylindrical portions 66 is that of the ring and eccentric assembly, but the arm proper is of considerably lesser axial width and extends from an intermediate part of the cylindrical fragment. A pair of retaining rings 68 is provided, each having a radial flange 69 at the inner end and of an axial width permitting either ring to be mounted on the cylindrical portions of the three rocker arms and on one side of the arms proper and the steel ring 63. A bolt 70 is passed through the arm portion of each rocker and engages with its washer 71, adjoining the crown bur nut against the outer side of one flange 69 and with its head 73 against the outer side of the other flange 69.

The arm of each rocker has at its free end an axial aperture for a wristpin 75 of a length equal to the axial length of the cylindrical part of a rocker and held by its midway portion and set screw 76 co-acting therewith (Fig. 1A).

The wrist pin is journaled with either arm on one side of the rocker in one of a pair of aligned holes 78 in either of which is formed near the free end of either bifurcation 79 of an alternator or inner clutch member 80. The bifurcations are joined at their opposite ends and are integral with a laterally extending stem 82 splined into a central hole in the star portion of the alternator which portion has a thin cylindrical part 85 adjacent the bifurcations. Figures 17 and 19 illustrate the alternator or inner clutch part in detail.

The star portion is a part of an over running clutch structure and characterized by a plurality of uniformly spaced teeth 87 which project beyond a surface approaching that of a cylinder, but distinguished therefrom by the fact there is a slight depression 88 behind (viewed clockwise) a tooth and the distance of the surface from the axis increases in the direction toward the next (clockwise) tooth.

In the rear side of each tooth and above the depression is a socket 89 for a coil spring surrounding the stem of a shoe (both not shown) which engages a roller 92. The same engages the inner cylindrical wall surface of a recess formed in either end of a cup 95, as seen in Figure 1A. Owing to the construction of the surface between the star teeth the force with which the roller presses against the concave surface of the recess increases as the roller approaches the tooth ahead of it viewed clockwise. The flange 85 holds the rollers in the recess of the cup.

The cup 95 is recessed at both ends and keyed at 97 by its intermediate portion upon one of three auxiliary shafts 100. Each shaft is of a length slightly less than the axial length of the casing and its reduced left-hand or front end portion 101 is journaled in a bearing device 102 mounted in a recess in a boss 103 on the inner side and lower part of the front end and behind a washer 104 (Fig. 1A). The cup 95 of each shaft 100 is in alignment with the intermediate portion 106 of shaft 17 which portion is between the eccentric portions described. Each shaft 100 also includes a second intermediate bearing portion 101 journaled in a bearing device 102 arranged in an enlarged lower part 103 of the partition 49. From the right-hand end of the intermediate bearing portion 101 of each shaft 100 extends a shaft portion 110 upon which a spur gear 111 is keyed by means of a key 112. In order to hold each shaft 100, the parts carried thereby or coacting therewith, the following construction is provided. A washer 114 surrounds the shaft and bears against the inner race of the front end bearing device and with its right-hand side against the left-hand end of a bushing 116. Another washer 114 bears against the inner race of the intermediate bearing device and against the left-hand end of a bushing 116 which bears with its right-hand end against a washer 114 that contacts with its other side the spur gear 111. The same is engaged on its other side by a washer 117, pressed by a hexagon nut 118 which is threaded on the shaft. The right-hand end of shaft portion 110 is journaled in a rear end bearing device 102 which is mounted in the rear end plate 7 in a similar manner in which the front end bearing of the shaft is mounted in the front end plate as indicated by like reference characters. The rear end plate is fastened to the cylindrical part of the casing in a manner similar to the front end plate as expressed by the same reference characters.

Each of the gears 111 is in mesh with a sun or master gear 125 which is splined by key 126 upon the enlarged inner cup-shaped portion 127 of a main output shaft 128 illustrated in detail in Fig. 20-22.

The cup part of shaft 128 is journaled in an inner bearing device 129 which is seated in an annular and angular recess formed in the inwardly extending flange 9 of the rear end plate. The same has a central shaft opening similar to that of the front end plate. Between the inner race of the bearing device 129 and the master gear is a washer 130. The left-hand end of the cup part of the output shaft carries a radial flange 131 which is received in an annular recess in the sun gear and surrounding the shaft hole therein whereby the sun gear is held against axial motion.

The bottom of the cup part of the output shaft is centrally tapped for the reduced threaded portion 135 of a stop bolt 136 which carries a nut 137 bearing against the inner surface of the bottom of the cup (Fig. 1B). The left-hand end of the stop bolt functions as an adjustable stop for the right-hand end of the shaft 27 (Fig. 1B). On the high-pitch threaded portion 34 of that shaft 27 and adjacent to the end named is a high-pitch nut 140 which has a flange 141 intermediate its ends, exteriorly smooth portions on either side of such flange and an exteriorly threaded part 142 on the left-hand end for a nut 143 (Fig. 1B). The interior threads of the adjusting nut fit the high-pitch threads 34 on the right-hand end portion of the shaft 27. The right-hand end portion 144 of the input shaft fits into an annular recess 193 formed in the left-hand part of the high-pitch nut 140 and is splined by tongue 139, Figure 2, to the same. The smooth part of the nut 140 to the left of the flange 141 is revolubly mounted in the inner race 145 of a thrust bearing which bearing includes an intermediate ring with depressions for balls 146 on either side and a cylindrical flange 147 extending from either side of the ring. The thrust bearing also includes a pair of apertured ball retaining ring plates 149. An outer race 150 is located between the right-hand series of balls and the flange of the high-pitch nut, another one between the left-hand series of balls and the locknut 143. The thrust bearing for the nut 140 is mounted within the central opening of a bearing housing or thrust collar 155 which is made in two upper and lower parts (Fig. 2) and equipped with a pair of opposed trunnions 156. Either of the same carry a spacing washer 194 (Figure 2) to space the housing within the central opening 195 of a fork still to be described and is journaled in a square steel block 158, slidably arranged in a guide opening.

Such opening is arranged in either laterally enlarged side portion 159 of an adjusting fork lever 160 (Fig. 2, 3). The ends of the trunnions are diametrally apertured for the insertion of a cotter pin 161 bearing against the outer surface of a steel block.

The lower end of the lever is apertured for a bushing 162 containing a headed fulcrum bolt 163. The same carries at the headless end a cotter pin 161 and is mounted in the bifurcated portion of a fulcrum base 165 which is fastened by screws 166 to the bottom part of the cylindrical casing wall.

The top end of the fork lever 160 has a notch for a traveling nut 168 provided on either opposed vertical side with a trunnion 169. Either trunnion is journaled in a steel shoe 170 and provided at its outer end with a cotter pin 161. Either steel shoe is slidably arranged in a longitudinal notch arranged in one of the arms on either side of the nut 168 and forming the upper bifurcated end of lever 160.

The same is engaged on the screw part of an adjusting stem 172 which is illustrated in detail in Fig. 23. The front or left-hand smooth end part of the adjusting shaft extends into bushing 44 and is journaled in a bearing device 38 arranged in an enlargement formed on the right-hand side of the casing partition. Another smooth part of the adjusting shaft lies to the right of the screw part and carries intermediate its length a flange 175 which co-acts with a similar end flange of a bearing bushing 177. The same is mounted in an opening in the boss 178 on the exterior side of the rear end plate. A spacing sleeve 180 has at its left-hand end a flange bearing against the boss and enclosing the smooth part of the adjusting stem and disposed outside of the casing. A hand wheel 182 has at its laterally extending hub portion an opening for the smooth part of the adjusting stem near the right-hand end thereof and is splined on the shaft by means of a key 97 and held against axial displacement by a nut 184 which is threaded upon the reduced right-hand end part of the adjusting shaft. A handle 185 is affixed to the hand wheel.

The bottom of the cup part of the main output shaft is integral with a reduced concentric bearing part 186 into which the tapped hole in the bottom extends (Fig. 1B). This part is revolubly mounted in a bearing device 38 spaced from the bearing device of the cup part by a spacing sleeve 188 and arranged within the flange 9, 10 of the rear end plate. To the right of part 186 is a threaded part engaged by a locknut 190 which bears against the inner race of the bearing device 38 and is provided with a plurality of tapped radial holes 191 for a screw plug 192. The smooth part of the output shaft to the right of locknut 190 is surrounded by an oil retainer 15 which is held in position by a flat flange 14 of the small rear end plate 12 which is a counterpart of the small front end plate and secured to the large rear end plate in a manner similar to that of the front end structure.

Presuming the transmission to be used in connection with an automobile, the crankshaft and the propelling motor is connected in any suitable manner rigidly to the left-hand section of the input shaft 17. The right-hand end portion of the output shaft 128 leads to the differential or rear wheel drive (not shown) of the automobile or vehicle. The pair of eccentric assemblies which function as control or governor devices are carried by the input shaft and rotate therewith. The governor devices are movable radially outward in opposite directions relative to the input shaft and are geared by means of the racks to the adjusting shaft housed in the input shaft for a purpose which will become clear as the description of operation proceeds.

Each control device or eccentric assembly is also journaled in an assembly of three rockers 66, 67 which are moved radially of the input shaft in succession. Each rocker causes an angular displacement of an alternator or inner part of an overrunning clutch the outer part of which is fixed upon one of three auxiliary shafts 100. Said shafts carry upon their right-hand ends gears in mesh with a sun or master gear rigid with the output shaft.

In order to vary the speed of the latter the length of the stroke of the rockers is varied by an adjusting mechanism including the racks one of which is carried by each eccentric assembly or control device and the adjusting shaft in mesh with the racks through openings in the eccentric portions of the input shaft. The adjusting shaft 27 is held by the spring 25 in a predetermined position within the input shaft, but may be turned against the resistance of said spring 25 by means herein before structurally described the operation of which will be described later. The turning of the adjusting shaft moves the eccenter assemblies or control devices from centric to eccentric positions relative to the axis of the input shaft with the result that the radial stroke of the rockers are increased.

The adjusting shaft 27 is rotated by the engagement between its high-pitch thread part 34 and the adjusting nut 140. The same is rotatably mounted in the lever assembly 145—169 and slidably splined to shaft 17 and may be moved axially of the adjusting shaft by a swing of lever 160, caused by the rotation of the screw stem 172. Axial motion of nut 140 causes rotation of the adjusting shaft. The screw shaft 172 holds the lever 160 in adjusted position.

The more the adjusting shaft 27 is rotated by its nut 140 relative to the input shaft 17 to move the eccentric assemblies in a direction from centric to eccentric positions relative to the axis of the input shaft, the greater is the speed of the output shaft.

Various changes may be resorted to provided they fall within the spirit and scope of the invention as defined in the appended claims.

What I claim as new and desire to protect by Letters Patent of the U. S. is as follows:

1. In an adjusting mechanism for transmissions of the character described, comprising in combination with a transmission including an input shaft having a second shaft rotatably disposed therein and substantially co-extensive therewith and with the transmission, said input shaft being operatively connected to movable eccentric control means geared to said second shaft for eccentric movement relatively to the input shaft in response to rotation of the second shaft relatively to the input shaft; said adjusting mechanism comprising a lever pivotally mounted at one end thereof, said second shaft having a threaded portion at the end thereof adjacent the output end of the transmission, a nut engaging said threaded portion and supported for sliding movement on the end of said input shaft adjacent said threaded portion and splined to the input shaft for rotation therewith, a thrust bearing assembly for said nut, a thrust collar for enclosing said bearing assembly, trunnions projecting laterally from the thrust collar, said lever having an opening to loosely receive the thrust collar and through which the threaded part of the second shaft extends, and provided with openings for rotatably and slidably receiving the trunnions, and means for engaging and actuating the opposite, free end of the lever for rocking it on its pivot and in a direction longitudinally of the second shaft to cause the nut to move longitudinally of the second shaft for rotating the latter relative to the input shaft.

2. In an adjusting mechanism for transmissions of the character described, comprising in combination with a transmission including an input shaft having a second shaft rotatably disposed therein and substantially co-extensive therewith and with the transmission, said input shaft being operatively connected to movable eccentric control means geared to said second shaft for eccentric movement relatively to the input shaft in response to rotation of the second shaft relatively to the input shaft; said adjusting mechanism comprising a lever pivotally mounted at one end thereof, said second shaft having a threaded portion at the end thereof adjacent the output end of the transmission, a nut engaging said threaded portion and supported for sliding movement on the end of the said input shaft adjacent said threaded portion and splined to the input shaft for rotation therewith, a thrust bearing assembly for said nut, a thrust collar for enclosing said bearing assembly, trunnions projecting laterally from the thrust collar, said lever having an opening to loosely receive the thrust collar and through which the threaded part of the second shaft extends, and provided with openings for rotatably and slidably receiving the trunnions, a feed screw disposed substantially parallel to said second shaft, a follower member threadedly engaging the feed screw and provided with opposed trunnions, and said lever being provided with a bifurcated free end for receiving said follower and a portion of the feed screw and provided with slidably disposed trunnion blocks for rotatably receiving the follower trunnions whereby said lever will be rocked on its pivot in directions longitudinally of the second shaft and feed screw when the latter is revolved for moving the nut longitudinally of the threaded portion of the second shaft for rotating the latter relative to the input shaft.

3. In an adjusting mechanism for transmissions of the character described, comprising in combination with a transmission including an input shaft having a second shaft rotatably disposed therein and substantially co-extensive therewith and with the transmission, said input shaft being operatively connected to movable eccentric control means geared to said second shaft for eccentric movement relatively to the input shaft in response to rotation of the second shaft relatively to the input shaft, an output shaft and a driving connection between the control means and output shaft; said adjusting mechanism comprising a lever pivotally mounted at one end thereof, said second shaft having a threaded portion at the end thereof adjacent the output end of the transmission, a nut engaging said threaded portion and supported for sliding movement on the end of said input shaft adjacent said threaded portion and splined to the input shaft for rotation therewith, a thrust bearing assembly for said nut, a thrust collar for enclosing said bearing assembly, trunnions projecting laterally from the thrust collar, said lever having an opening to loosely receive the thrust collar and through which the threaded part of the second shaft extends, and provided with openings for rotatably and slidably receiving the trunnions, means for engaging and actuating the opposite, free end of the lever for rocking it on its pivot and in a direction longitudinally of the second shaft to cause the nut to move longitudinally of the second shaft for rotating the latter relative to the input shaft, and a stop interposed between the threaded end of said second shaft and the output shaft and adjustably connected to the latter for adjustably positioning said second shaft longitudinally of the input shaft.

4. In an adjusting mechanism for transmissions of the character described, comprising in combination with a transmission including an input shaft having a second shaft rotatably disposed therein and substantially co-extensive therewith and with the transmission, said input shaft being operatively connected to movable eccentric control means geared to said second shaft for eccentric movement relatively to the input shaft in response to rotation of the second shaft relatively to the input shaft, an output shaft and a driving connection between the control means and output shaft; said adjusting mechanism comprising a lever pivotally mounted at one end thereof, said second shaft having a threaded portion at the end thereof adjacent the output end of the transmission, a nut engaging said threaded portion and supported for sliding movement on the end of said input shaft adjacent said threaded portion and splined to the input shaft for rotation therewith, a thrust bearing assembly for said nut, a thrust collar for enclosing said bearing assembly, trunnions projecting laterally from the thrust collar, said lever having an opening to loosely receive the thrust collar and through which the threaded part of the second shaft extends, and provided with openings for rotatably and slidably receiving the trunnions, and means for engaging and actuating the opposite, free end of the lever for rocking it on its pivot and in a direction longitudinally of the second shaft to cause the nut to move longitudinally of the second shaft for rotating the latter relative to the input shaft, said lever, nut and the threaded portion of the second shaft being disposed adjacent one end of the transmission and adjacent to said output shaft and remote to the eccentric control means.

GUIDO F. SCHLOTE.

REFERENCES CITED

The following references are of record in the file of this patent:

UNITED STATES PATENTS

| Number | Name | Date |
| --- | --- | --- |
| 1,227,164 | Manly | May 22, 1917 |
| 1,897,416 | Baum | Feb. 14, 1933 |
| 1,937,127 | Pitter | Nov. 28, 1933 |
| 2,051,783 | Dake | Aug. 18, 1936 |
| 2,144,447 | Barnhart | Jan. 17, 1939 |
| 2,204,514 | Schlote | June 11, 1940 |

FOREIGN PATENTS

| Number | Country | Date |
| --- | --- | --- |
| 193,645 | Great Britain | Mar. 1, 1923 |
| 219,434 | Great Britain | July 31, 1924 |